United States Patent [19]
Satter

[11] 3,794,275
[45] Feb. 26, 1974

[54] DETACHABLE LIFT SPOILER FOR STATIONARY AIRCRAFT

[76] Inventor: Sheldon M. Satter, 1555 N. Crescent Dr., Cedarburg, Wis. 53012

[22] Filed: May 12, 1972

[21] Appl. No.: 252,908

[52] U.S. Cl. .................................................. 244/41
[51] Int. Cl. ............................................. B64c 3/58
[58] Field of Search ........ 244/40 R, 40 A, 41, 42 D; 24/243 A, 265 A

[56] References Cited
UNITED STATES PATENTS

| | | | |
|---|---|---|---|
| 3,108,766 | 10/1963 | Beckman | 244/42 D |
| 2,453,403 | 11/1948 | Bogavdus | 244/40 R |
| 2,692,746 | 10/1954 | Thomas | 248/74 B |

Primary Examiner—George E. A. Halvosa
Assistant Examiner—Sherman D. Basinger
Attorney, Agent, or Firm—James E. Nilles

[57] ABSTRACT

A detachable lift spoiler for placement on the upper surface of the wing of a parked or tied-down aircraft to inhibit or prevent lift forces from being generated by the aircraft wing as wind blows therearound is generally prismatic in form and is secured on its forward side by a removable forward attachment member which is bendable to fit and grip the leading edge of the wing and is secured on its rearward side by a removable rearward attachment member which grips the trailing edge of the wing. One or more lift spoilers are used on each wing.

10 Claims, 11 Drawing Figures

PATENTED FEB 26 1974  3,794,275
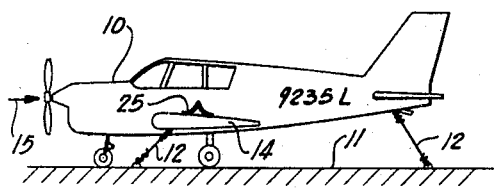
Fig. 1
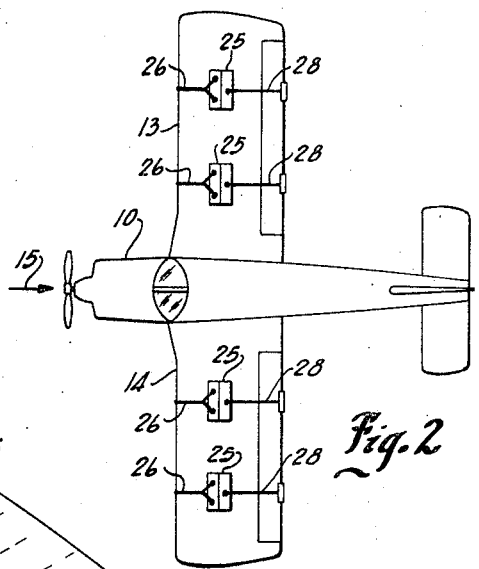
Fig. 2
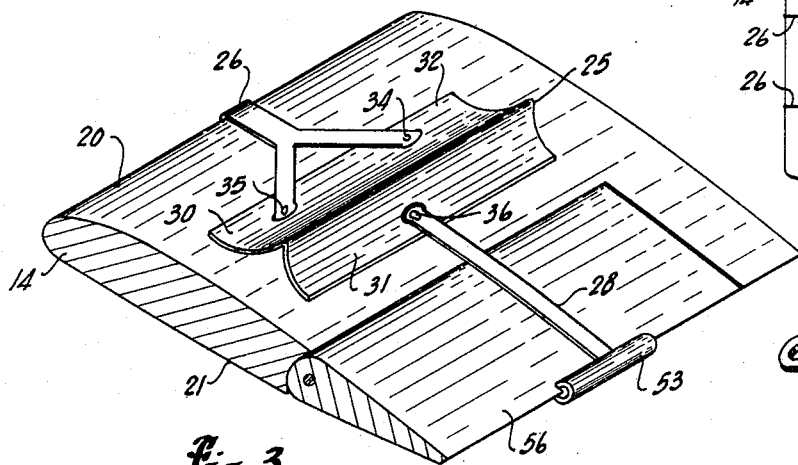
Fig. 3
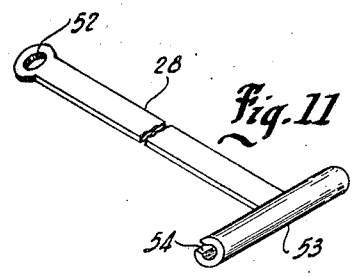
Fig. 11
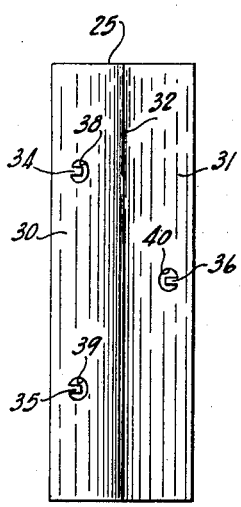
Fig. 4
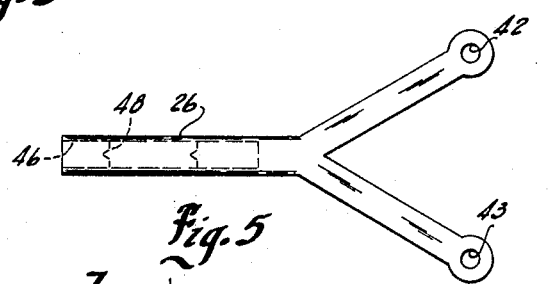
Fig. 5
Fig. 6
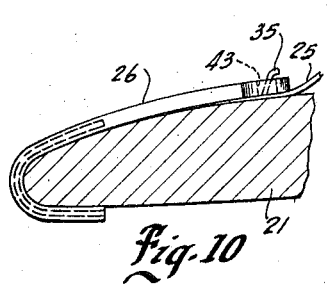
Fig. 10
Fig. 7
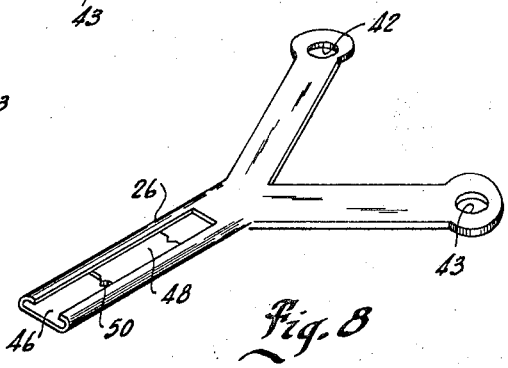
Fig. 8
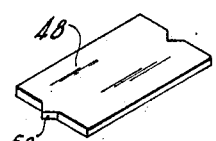
Fig. 9

DETACHABLE LIFT SPOILER FOR STATIONARY AIRCRAFT

BACKGROUND OF THE INVENTION

1. Field of Use

This invention relates generally to lift spoilers for aircraft wings and, particularly, to detachable spoilers used to inhibit or prevent lift being generated by wind acting on the wings of parked or tied-down aircraft.

2. Background of the Invention

When airplanes are parked or tied down at air fields there is always a possibility that the winds may assume an appropriate direction and sufficient velocity with respect to the wings of the airplane so as to cause the wing to generate lift. If the lift force is sufficiently great, a parked aircraft, even though braked or chocked, will tend to rise from the ground, be blown about, or even overturn, with resultant damage to itself, other aircraft, adjacent structures or personnel. These lift forces can and have reached a magnitude sufficient to cause structural damage to a tied-down airplane or even tear it loose from its moorings with resultant physical damage. These lifting forces are due to the aerodynamic characteristics of the aircraft wing when exposed to the passage of air or wind in an appropriate direction (i.e., normally toward the leading edge of the wing) and at a velocity (steady or gusting) usually equal to or greater than the flying speed of the airplane involved, taking its weight into account. As is well known, it is the relative motion between the aircraft wing and the relative wind which generates lift and it is immaterial whether the wing moves with respect to the air or the air with respect to the wing.

Heretofore, it was the practice to anticipate and counteract such lift forces by using tie-down devices such as ropes or chains which were sufficiently strong and securely anchored. If especially high winds were forecast or expected, more tie-down devices were employed. However, it does not appear that a solution to the problem was approached from the standpoint of aerodynamics, even though the use of lift spoilers on aircraft wings for in-flight purposes is well-known.

SUMMARY OF THE PRESENT INVENTION

The present invention contemplates a conventional airplane having a wing which tends to exhibit lift when a mass of air moves relative thereto.

In accordance with the present invention there are provided one or more lift spoilers for detachable mounting on a surface of the wing, preferably the cambered upper surface, and attachment means for releasably securing the spoilers on the wings when the airplane is stationary, i.e., parked or tied-down outdoors. In a preferred embodiment of the invention each spoiler has the general configuration of an elongated prism and is adapted to be disposed with its longitudinal axis lengthwise on the wing. The total length of one or more spoilers should be about 20 to 25 percent of the length of the wing on which used or such length as will insure effective spoilage of the lifting power of the wing under extreme wind conditions. The attachment means preferably comprise a forward attachment member which is adapted to releasably engage the spoiler and releasably engage the leading edge of the wing. The attachment means also preferably comprise a rear attachment member which is adapted to releasably engage the spoiler and releasably engage the trailing edge of the wing. In further accordance with the invention, the forward attachment member is constructed so as to be permanently formable to the shape of the leading edge of the wing. Also, the spoiler is fabricated of resilient material such as sheet metal, plastic or fiber glass so as to allow it to be stretched slightly so that the rear attachment member can be engaged with the railing edge of the wing after the forward attachment member is in place on the leading edge. In a preferred embodiment the attachment members are fabricated of relatively flexible plastic and the forward attachment member is provided with an internal stiffener, such as a piece of sheet metal which enables the forward attachment member to be permanently bent or formed to the shape of the leading edge of the wing with which it is to be used.

A spoiler and attachment means in accordance with the invention functions as an additional safety feature for use with aircraft, reduces the likelihood of damage to the aircraft, is relatively uncomplicated and economical to manufacture, simple to use, lightweight and relatively compact for storage in an airplane or elsewhere.

Other objects and advantages of the invention will hereinafter appear.

DRAWINGS

FIG. 1 is a side elevational view of a conventional low-wing tricycle landing gear type airplane shown tied-down and employing detachable lift spoilers in accordance with the invention;

FIG. 2 is top plan view of the airplane with spoilers shown in FIG. 1;

FIG. 3 is an enlarged isometric view of a section of one of the airplane wings shown in FIGS. 1 and 2 with a spoiler thereon;

FIG. 4 is a top plan view of the spoiler shown in FIG. 3;

FIG. 5 is a top plan view of the removable forward attachment member for the spoiler shown in FIGS. 3 and 4;

FIG. 6 is a side view of the forward removable member shown in FIG. 5;

FIG. 7 is an end view of the forward attachment member shown in FIG. 6;

FIG. 8 is an isometric view of the underside of the forward attachment member shown in FIGS. 5, 6 and 7, and showing a stiffener means disposed therein;

FIG. 9 is an isometric view of the stiffener means shown in FIG. 8;

FIG. 10 is a side view of the forward attachment member of FIGS 5, 6, 7 and 8 showing it after it has been bent to shape; and FIG. 11 is an isometric view of the rearward removable attachment member for the spoiler shown in FIGS. 3 and 4.

DESCRIPTION OF A PREFERRED EMBODIMENT

Referring to FIGS. 1 and 2 of the drawing, the numeral 10 designates a conventional propeller driven low wing tricycle landing gear type airplane which is shown as secured outdoors to the ground 11 in stationary position by conventional tie-down ropes 12. Airplane 10 comprises a right wing 13 and a left wing 14, each embodying a conventional airfoil section as FIG.

3 shows, which are understood to be acted upon by a mass of air moving in the direction of the arrow 15, i.e., directly toward the leading edges of the wings 13 and 14.

It may be assumed for purposes of discussion that the air mass is moving at a velocity sufficient to generate lifting forces on the aircraft wings as it moves across the upper and lower surfaces 20 and 21, respectively, of the wings, taking into consideration such factors as wing design, aircraft weight and flying speed of the aircraft. It is to be further understood that the wind velocity is great enough to generate lifting forces sufficient to lift airplane 10 off the ground if it were not tied down. In some type of general aviation aircraft, for example, a wind velocity of about 60 miles per hour or above would be sufficient to accomplish this.

In accordance with the invention, the wings 13 and 14 of airplane 10 are provided with spoilers 25 which are secured to the upper surfaces of the wings by attachment means comprising forward attachment members 26 and rear attachment members 28. In the embodiment shown, each wing is provided with two spoilers 25 and the combined length of the two spoilers is equal to about 20 to 25 percent of the effective length of the wing.

FIGS. 3 and 4 show that each spoiler 25 is preferably fabricated from a single rectangular piece of stiff but slightly flexible or resilient material, such as sheet metal, plastic, fiber glass or the like, which is premanently bent, folded or otherwise shaped so as to provide a forward surface 30 and a rear surface 31 which intersect to form an apex, peak or ridge line 32. When in position on the wing 14, with its bottom opening closed off, the spoiler 25 presents the appearance of a prism having concave surfaces 30 and 31.

In a practical embodiment of the invention for use with smaller conventional general aviation aircraft having overall wing spans in the range of 30 to 40 feet (each separate wing panel therefore being on the order of 13 to 18 feet), each spoiler 25 is on the order of about 2 feet long, about 5 inches high (from the upper wing surface to the apex or ridge line 32, and about 8 inches wide (from front edge to rear edge).

As FIG. 4 shows, spoiler 25 is provided at the lower flatter portion of its forward surface 30 with means, such as upwardly extending projections, hooks or prongs 34 and 35, to which the forward attachment member 26 is detachably connectible. Spoiler 25 is also provided at the lower flatter portion of its rear surface 31 with means, such as an upwardly extending projection, hook or prong 36, to which the rear attachment member 28 is detachably connectible. The hooks 34, 35 and 36 are preferably formed integrally with the spoiler 25 as by providing cutouts 38, 39 and 40, respectively, and bending the remaining portion upwardly. However, other types of hooks could be provided.

The forward attachment member 26 for detachable engagement with the forward hooks 34 and 35 of spoiler 25 is shown in detail in FIGS. 5, 6, 7, 8 and 10. Forward attachment member 26 is preferably fabricated from a single piece of flexible material such as plastic and has a flat Y-shaped configuration. Member 26 is provided with holes 42 and 43 at the ends of its divergent arms for releasable engagement with the hooks 34 and 35, respectively, on the forward surface 30 of spoiler 25. Preferably, member 26 and member 28 hereinafter described are formed by casting or injection-molding of relatively flexible materials, such as soft but strong plastic or rubber. Furthermore, these members should be relatively flat, at least in the region of the holes therein, so that the holes can easily engage and disengage the hooks provided on or integrally formed in the spoiler 25. Use of soft materials enables the members 26 and 28 to be easily handled without danger of abrasion or cutting of the hands of the user. Use of such materials also enables these members to be stored in the aircraft when not in use without risk of damage or tearing of the upholstery therein. Also, such materials reduce the risk of damage to fabric covered wings or control surfaces.

It is within the scope of the invention, however, that the members 26 and 28 be made of sheet metal, for example. In the latter instance, the forward member 26 could be bendable to the shape of the leading edge without the need for a separate stiffener such as stiffener 48 hereinafter described.

It is also to be noted that in the embodiment shown, the spoiler 25 is designed to provide the resiliency necessary to stretch the entire assembly of spoiler 25 and the attachment members 26 and 28 so that the latter can be engaged with the trailing edge of the wing. However, either or both of the members 26 and 28 could be designed to stretch somewhat (as by fabrication from stretchable materials or inclusion of a spring section) to provide the necessary resiliency.

Member 26 is provided on its underside with a slot or groove 46 in which a stiffener 48 (shown in FIG. 9), in the form of a piece of bendable sheet metal, is located. Initially, member 26 and stiffener 48 are both flat. When put to use, however, the shank of member 26 with the stiffener 48 secured in place therein is manually bent by the user to make it conform to the shape of the leading edge of the airplane with which it is used, as shown in FIG. 10. Stiffener 48 remains secured in slot 46 of member 46 by bending the pointed projection 50 thereof into the soft plastic surface of groove 46. Member 26 is thus releasably engageable with the leading edge of wing 14 and retains its curved shape.

The rearward attachment member 28, shown in detail in FIGS. 3 and 11, is preferably fabricated from a single piece of flexible material such as plastic and has a flat T-shaped configuration. Member 28 is provided with a hole 52 at one end thereof for releasable engagement with hook 36 on the rear surface 31 of spoiler 25. Member 28 is provided at its other end with a tubular portion 53 having a slot 54 therein which enables it to releasably engage the trailing edge of wing 14.

Each spoiler 25 and its attachment members 26 and 28 are employed as follows, assuming forward member 26 has already been bent to conform to the shape of the wings leading edge. First, each attachment member is hooked onto the appropriate sides of the spoiler 25. Then the entire assembly is placed on the wing (preferably with the user standing in front of the wing) at the desired location and forward member 26 is fitted snugly against the wing's leading edge. The operator then proceeds to the rear of the wing and draws on the rear attachment member 28 until the slot 54 therein is able to engage the wing's trailing edge. Such movement is possible because of the give or resiliency between the front and rear surfaces 30 and 31, respectively, of the spoiler 25. When the rear member is attached, the tendency of the spoiler surfaces 30 and 31 to draw together snugly attaches the entire assembly to the wing. Each spoiler 25 is mounted in a similar manner at a desired location and one or more spoilers may be mounted on each wing panel, as desired. Preferably, total length of the spoilers used should amount to about 20 to 25 percent (or possibly more) of the total wing length.

If the rear attachment member 28 engages the trailing edge of the wing in the region of an aileron 56 (as shown in FIG. 3) provision must be made to secure the aileron against movement, as by the use of conventional control surface locking devices. Normally, engagement of the trailing edge of a flap will present no problem.

When properly positioned on the wing (i.e., in the region of maximum lifting force) the effect of an appropriate number of spoilers 25, is to interfere with normal air flow over the top surface of the wing and to prevent lifting forces from being developed. Thus, the aircraft has no tendency to rise, whether it is merely parked or actually tied down.

It is apparent from the foregoing description that the spoiler 25 and the attachment members 26 and 28 could be made of a wide variety of materials. Thus, as mentioned, the spoiler 25 could be made of sheet metal, sheet plastic, sheet fiberglass or the like. The attachment members preferably are cast or injection-molded from pliable plastic or rubber but could, for example, be formed of sheet metal.

It is also apparent that several spoilers 25 could be stacked or nested for compact storage and that the designs of all components lend themselves to relatively easy and economical manufacture.

RESUME

Lift spoilers 25 are provided for detachable mounting on the cambered upper surface 20 of the wings 13 and 14 of a stationary airplane 10 to diminish or eliminate lift forces when a mass of air moves relative to the wings. The spoilers 25 are provided with attachment means for releasably securing the spoilers on the wings when the airplane is parked or tied down outdoors. Each spoiler 25 has the general configuration (when in place) of an elongated prism with concave sides 30 and 31 and is adapted to be disposed with its longitudinal axis lengthwise on the wing. The attachment means comprise a forward attachment member 26 which is adapted to releasably engage the spoiler 25 and releasably engage the leading edge of the wing. The attachment means also comprise a rear attachment member 28 which is adapted to releasably engage the spoiler 25 and releasably engage the trailing edge of the wing. The forward attachment member 26 is Y-shaped and is constructed of relatively flexible material and provided with an internal stiffener 48 so as to be permanently formable to the shape of the leading edge of the wing. The spoiler 25 is fabricated of resilient material, such as folded or bent sheet metal, plastic or fiber glass, so as to allow its front and rear surface to be resiliently movable so that the rear attachment member can be engaged with the trailing edge of the wing after the forward attachment member is in place on the leading edge.

I claim:

1. Apparatus for reducing or preventing lift forces from being generated on a wing of a stationary airplane when air moves therepast comprising:

at least one lift spoiler for disposition on a surface of said wing, said spoiler comprising a one-piece resilient member bent about a longitudinal axis to provide a forward surface and a rear surface which join along a line to form an apex and wherein a portion of at least one of said surfaces is resiliently movable with respect to the other, and two attachment members for connection to said spoiler, each attachment member being connectable to one surface of said spoiler, for gripping the leading and trailing edges of said wing to detachably connect said spoiler to said wing, said spoiler being resiliently extendable in response to tension on said attachment members to enable attachment of said attachment members to said wing edges, said spoiler being resiliently retractable to exert tension on said attachment to maintain said attachment members in engagement with said wing edges.

2. Apparatus according to claim 1 wherein said attachment members are releasably connected to said spoiler.

3. Apparatus according to claim 2 wherein said spoiler is provided with connection means at its forward and rear surfaces for releasable engagement with connection means on said attachment members.

4. Apparatus according to claim 3 wherein said connection means for said spoiler comprise integrally formed hooks and wherein said connection means for said attachment members are holes.

5. Apparatus according to claim 1 wherein at least one of said attachment members is permanently deformable to adapt to the shape of that edge of the wing which it grips.

6. Apparatus according to claim 5 wherein said one attachment member which is deformable grips the leading edge of said wing.

7. Apparatus according to claim 5 wherein said deformable attachment member is fabricated of flexible material and including a bendable stiffener member attached to said deformable attachment member.

8. Apparatus according to claim 7 wherein said deformable attachment member is provided with a groove in which said stiffener member is secured.

9. Apparatus according to claim 8 wherein said stiffener member is provided with at least one sharp projection whereby it engages said deformable attachment member to prevent its displace-ment.

10. Apparatus for reducing or preventing lift forces from being generated on a wing of a stationary airplane when air moves therepast comprising:

at least one lift spoiler for disposition on a surface of said wing and comprising forward and rear surfaces joined at an apex, at least one of said surfaces being resiliently movable with respect to the other, attachment means comprising at least two attachment members for connection to said spoiler for gripping the leading and trailing edges of said wing to detachably connect said spoiler to said wing, the attachment member for said leading edge being permanently deformable to attach to the edge of the wing which it grips, said deformable attachment member being fabricated of flexible material and being provided with a groove therein, and a bendable stiffener member disposed in said groove for maintaining said attachment member in the configuration in which it is deformed, said stiffener member being provided with at least one sharp projection whereby it engages said deformable detachment member to prevent its displacement in said groove.

* * * * *